April 7, 1970 A. C. EICHMANN ET AL 3,505,437
METHOD FOR ROTATIONAL MOLDING
Original Filed April 26, 1963 2 Sheets-Sheet 1
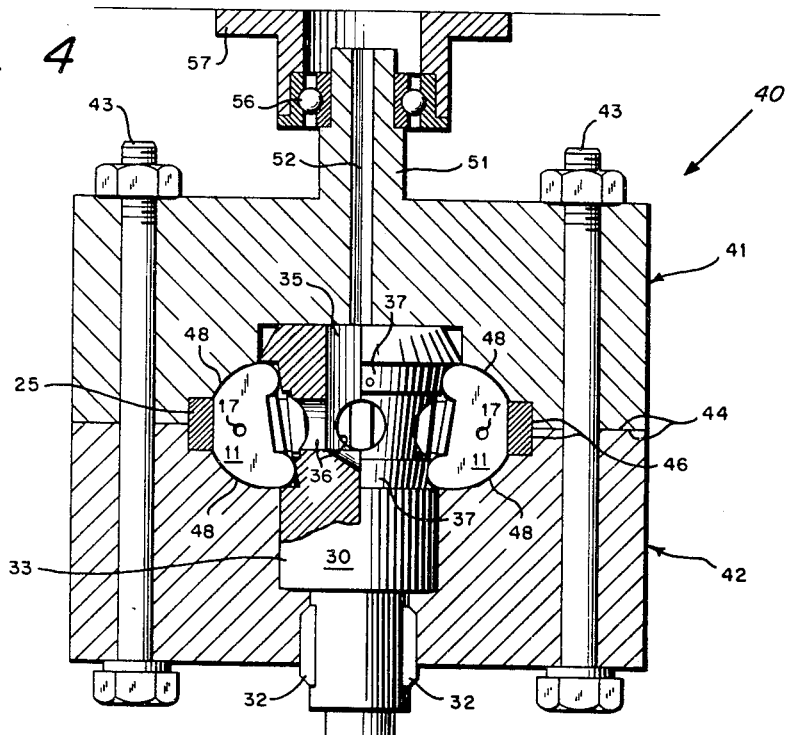
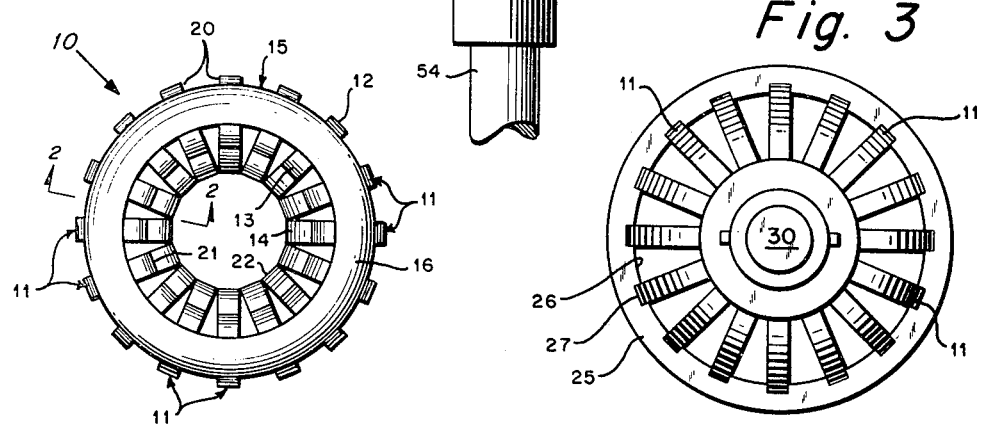
INVENTORS
ALBERT C. EICHMANN
CARL A. DAMM
JOHN R. HESS
RALPH L. McGIBONEY

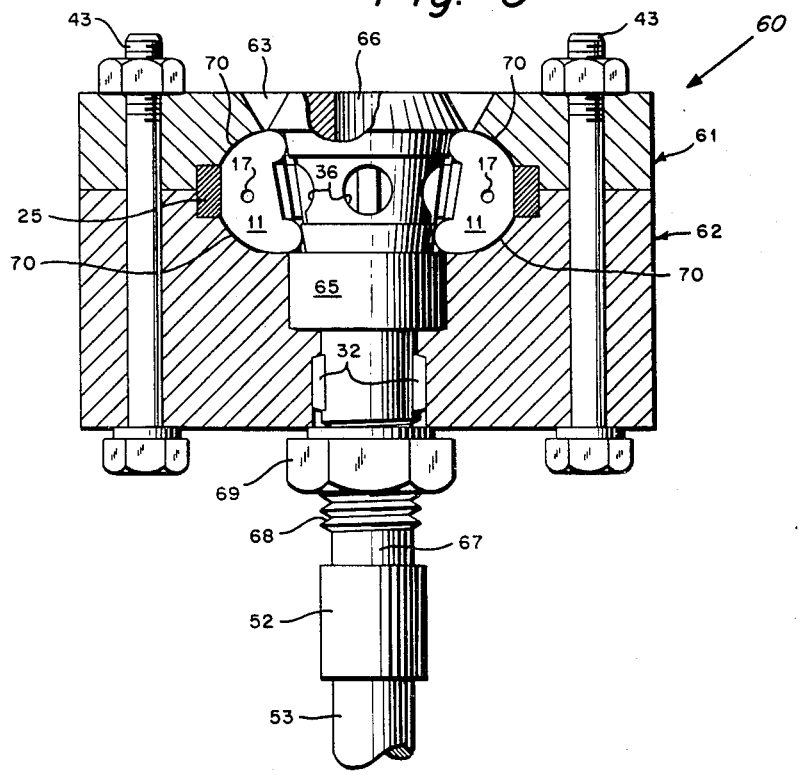
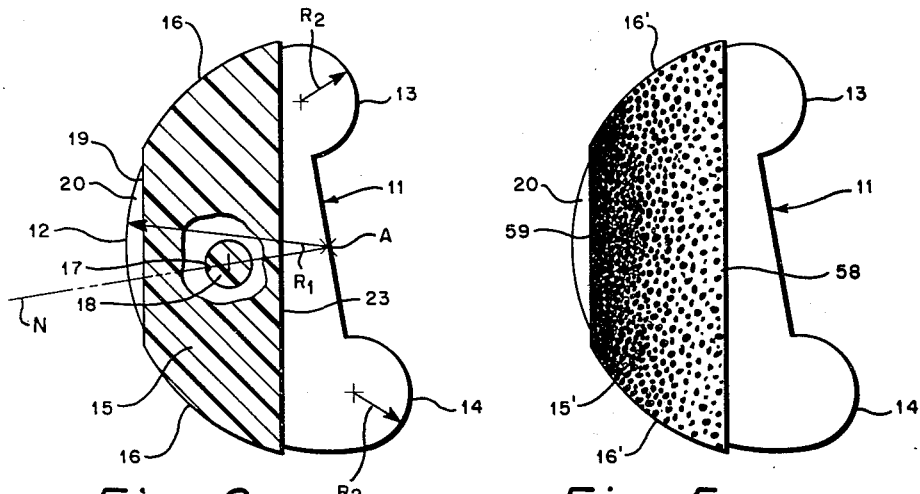

United States Patent Office 3,505,437
Patented Apr. 7, 1970

3,505,437
METHOD FOR ROTATIONAL MOLDING
Albert C. Eichmann, Bethayres, Carl A. Damm, Upper Black Eddy, John R. Hess, Oreland, and Ralph L. McGiboney, Prospectville, Pa., assignors to the United States of America as represented by the Secretary of the Navy
Original application Apr. 26, 1963, Ser. No. 276,112, now Patent No. 3,341,236, dated Sept. 12, 1967. Divided and this application July 17, 1967, Ser. No. 654,011
Int. Cl. B29h 9/10; B32b 15/06; B29d 27/04
U.S. Cl. 264—45                                                      1 Claim

ABSTRACT OF THE DISCLOSURE

A rotatable, annular assembly of spaced apart metallic sprags which are bonded together by a polyurethane elastomer and method and apparatus for making the assembly. The annularly arranged sprags, which are spaced apart by a notched spacer ring, are positioned in a centrifugal mold. The elastomer is introduced thereinto in a fluid state for one embodiment and in a foamed state for another. The mold is spun in a curing oven.

---

This is a division of application Ser. No. 276,112 filed Apr. 26, 1963, now U.S. Patent 3,341,236 issued Sept. 12, 1967.

The invention described herein may be manufactured and used by or for the Government of the United States of America for governmental purposes without the payment of any royalties thereon or therefor.

The present invention relates to the manufacture of a molded composite article and more particularly to the manufacture of a centrifugally-cast molded article.

Known article retaining structures, such as ball-detents and claws are characterized by providing a relatively small area of contact with the article to be retained in proportion to the size of the retaining structure and the number of retaining elements provided therein. Further, since the surface of the retained article engaged by the retaining members and the surface of the reaction member, as conventionally provided, are substantially in line in prior art devices, wearing of parts soon reduces the effectiveness of these devices.

The arrangement described in U.S. Patent No. 3,043,-614 is an attempt to obviate the above-noted deleterious condition by the formation thereof of an annular sprag assembly wherein the interstices between a plurality of metallic sprags having a semicircular body portion and opposed semicircular lip portions are partially filled with a flexible material having good surface characteristics, such as polyurethane. However, this structure was found to provide an unsatisfactory bond between the flexible material and the metallic sprags. Additionally, when the assembly moved between the opened and closed position thereof, the flexible material was significantly extruded outwardly beyond the exterior limits of the sprags with attendant friction problems of serious dimension. This factor obviously also decreased the life of the material between the sprags.

It is, therefore, an object of the present invention to overcome the above-noted and other disadvantages of the prior art and to provide a method of making a simple, compact, inexpensive and reliable mechanical coupling element.

Another object of the present invention is to provide a method of making a molded sprag assembly which is a bonded unit and one which is susceptible to mass production techniques.

An additional object of this invention is to provide a method for molding an annular assembly comprised of a plurality of metallic sprags and flexible material therebetween.

A still further object of the present invention is to provide a method for manufacturing an annular ring assembly, which method and apparatus is readily adjustable for providing annular ring assemblies of varying muscle or rotational force resistance.

Various other objects and advantages will appear from the following description of the several embodiments of the invention, and the most novel features will be particularly pointed out hereinafter in connection with the appended claim.

In the drawings:

FIG. 1 shows a plan view of the sprag assembly.

FIG. 2 illustrates an enlarged section taken along line 2—2 of FIG. 1 showing one sprag.

FIG. 3 illustrates a plan view of the sprags and retaining ring prior to introduction within the mold.

FIG. 4 illustrates a vertical cross-sectional view of one embodiment of the centrifugal mold with a portion of the core broken away for purposes of further clarity.

FIG. 5 is a view similar to that taken along the line 2—2 of FIG. 1 illustrating a second embodiment of the invention.

FIG. 6 is a vertical cross-sectional view of a second embodiment of the mold for producing the sprag assembly as shown in FIG. 5.

The sprag assembly, generally noted at 10 in FIGS. 1 and 2, is an annular structure which may be used in a mechanical coupling apparatus as shown, for example, in the U.S. Patent No. 3,043,614.

Referring to FIGS. 1 and 2, it will be seen that the sprag assembly 10 comprises a plurality of sprags 11 of metal or other suitable material, each of which, referring particularly to FIG. 2, has a semicircular body portion 12 of radius $R_1$ terminating in opposed semicircular lip portions 13, 14 of radii $R_2$, the lip portions 13 forming the mouth of the assembly 10. The interstices between the sprags are partially filled by wedge-shaped, truncated arcuate segments 15 of a flexible and elastic material having good surface bonding characteristics, such as an elastomer of polyurethane or the like, to form a generally annular assembly wherein sprags 11 are free to rotate to a limited extent about an annular axis A.

In order to insure that each sprag 11 has the lip portion 13 thereof engaging the appropriate abutting surface of the connector, not shown, such as for example, the groove 11 of the lock-on stud of Patent No. 3,043,614, the annular assembly 10 is formed with a thin elastic coating or cushion 16 of the elastomer which abuts the retaining surface, not shown, when the assembly 10 is placed into its operative position. In addition, the annular coating 16 is formed integrally with the segments 15 and thereby provides the segments with reinforcement in the inboard area subjected to the greatest stretching and stress.

As is clearly seen in FIG. 2, each sprag 11 includes an aperture 17 at the bisecting center line or neutral axis N thereof which passes through the annular axis A and which is filled with the elastomer to form an integral locking lug 18. By virtue of the totality of apertures 17 and lugs 18, the completed sprag assembly 10 is reinforced by the continuity of elastomer throughout the entire ring, thereby reducing the necessity of utilizing a strong bonding agent for joining the sprags and flexible material. Also, by placing the apertures 17 on the neutral axis N and near the outer perimeter of the sprags 11, the ring formed by the lugs 18 is subjected to the least possible stresses when the assembly 10 is flexed in the operation thereof. It is further contemplated by this invention that an annular spring element, not shown, may be provided to extend through the aperture 17 to obtain an additional mechanical bond.

In order to preclude the extrusion of the flexible material beyond the confines of the assembly 10 when the same is rotated about the annular axis between the opened and closed position, the truncated arcuate segment 15 has the planar outer surface 19 thereof forming a cavity 20 with the adjacent sides of the sprags 11 into which the material of the segment 15 may extrude. This cavity also provides a housing for the oil or other appropriate material utilized in lubricating the assembly 10 in the operation thereof.

Although the lip portions 13–14 are illustrated as having a semicircular configuration, it is contemplated by this invention that the engaging edges of the lower lips may be flattened to eliminate point contact and to provide a greater bearing surface.

With reference to FIGS. 1, 2 and 4, it is seen that the sprag assembly is constructed with the upper lip portions 13 separated from each other thereby forming a normally open mouth or aperture 21, and is additionally constructed with the lower lip portions 14 in abutting relationship thereby forming a normally closed aperture 22. It is further seen that the segment 15 has the outboard planar surface 19 and inboard planar surface 23 thereof positioned normal to a radial line from the polar or longitudinal axis in the plane of the annular axis A of the assembly 10. This attitude is important for the proper mechanical functioning of the assembly whereby the mouth 21 returns to the normally open position, as illustrated in FIG. 1, after having been urged to the closed or locking position wherein the lip portions 13 were in abutting relationship.

The method and apparatus for constructing the sprag assembly 10 will now be described with reference to FIGS. 3 and 4 which illustrate, generally, spacer ring 25, mold core member 30 and centrifugal mold 40. The spacer ring 25 is of annular configuration and includes an inner circumferential face 26 having a plurality of notches 27, equal to the number of sprags 11 in the assembly 10, formed therein. The ring 25 and the face 26 thereof, thereby, not only position the sprags 11 in the notches 27, but also provide, between the sprags 11, the outboard confine for the elastomer and permit the formation of the cavities 20 into which the extruded material flows.

In the assembly of the sprags 11 prior to the introduction thereof into the mold 40, the core member 30 is placed vertically in an assembly jig known to those skilled in the art, and not shown, which includes a plurality of slots for vertically and circumferentially positioning the sprags 11. After the sprags are placed into the above-mentioned slots and seated against the core 30, the spacer ring 25 is lowered over the assembled sprags and assumes a horizontally central position about the assembly. The sprag-spacer ring-core arrangement, illustrated in FIG. 3, is then separated from the jig and interposed within the mold 40, as shown in FIG. 4.

Referring now more particularly to FIG. 4, it is seen that the core member 30 comprises an integral shaft 31 secured to the mold 40 by keys 32 and an upper core portion 33 having a longitudinal bore 35 extending partially therethrough. Extending 90° to each other and communicating with the bore 35 are a pair of radial ports 36 for supplying the elastomer in its fluid state to the assembled sprags 11. Circumferential shoulder portions 37 are formed in the upper core portion 33 and are angularly related to the longitudinal axis of the core 30 to obtain an abutting relationship of the lip portions 14 and also to thereby obtain an assembly 10 having a normally opened aperture or mouth 21.

Referring again to FIG. 4, the centrifugal mold 40 comprises an upper mold section 41 and a lower mold section 42 jointed together by fasteners 43. Each of the sections 41–42 are constructed with abutting bases 44 each having circumferential grooves 46 formed therein for receiving and housing a portion of the spacer ring 25. Arcuately-shaped circumferential grooves 48, generally conforming to the radius $R_1$ of the sprag 11, are additionally formed in the upper and lower sections 41–42 for loose engagement with the semicircular body portions 12 of the sprags 11, which thereby permits the formation of the cushion or coating 16.

The upper section 41 also includes an axial shaft member 51 having a material inlet opening 52 extending therethrough and communicating with the longitudinal bore 35 in the core member 30.

As illustrated in FIG. 4, the mold as above described in assembled form is attached by shaft 31, through coupling 53, to a motor shaft 54 which is part of a temperature-controlled curing oven and spinning fixture (not shown), the motor being capable of rotating the mold at a speed necessary to produce the desired centrifugal force. The axial shaft member 51 is rotatably secured to the curing and spinning fixture by bearings 56 suitable secured to the frame 57 of the fixture.

Before the mold is spun, the curing oven is preheated and a metered quantity of polyurethane mixture in its liquid state is introduced by a hypodermic syringe directly into the middle section of the mold. In seeking its own level, the liquid polyurethane mixture passes through ports 36 and is distributed equally in all the voids existing between the sprags 11. As the mixture fills in, the displaced air rises through the space between the needle of the syringe and the inlet opening 52 and escapes the confines of the mold. The curing temperature and length of spinning time is then set in accordance with the specific formulation of the material inserted, and in accordance with the desired density or muscle of the flexible segments 15. When the mold spins, the material is driven by the centrifugal force into the voids between the sprags 11 thereby forming segments 15 and into the grooves 48 between the sprag edges and the mold thereby forming coating 16. When the spinning and curing process has been completed, the finished article shown by FIG. 1 may be removed from the mold.

A second embodiment of the invention is seen with particular reference to FIGS. 5 and 6. This embodiment utilizes an elastomer, such as polyurethane, in a foam form, which upon setting becomes rigid elastomeric foam. By reason of this variation in material used and other factors discussed below, the process produces segments 15′, shown in FIG. 5, which differ from segments 15 in that they vary in density from the inboard to the outboard edge of the sprag 11′, with the inboard portion 58 having the least density and the outboard portion 59 having the greatest density. It is therefore seen that an assembly is constructed wherein the area of the segment subjected to the greatest tensile stresses is formed with elastomer of the least density, that is, the most easily stretched without rupture. This is obtained without abandoning the desired muscle or spring force and without abandoning the bonding strength obtained by the elastomer wetting the surface area of the sprags 11.

In order to obtain the variable density segment 15′, the sprag-core-spacer ring assembly is interposed within the mold, generally noted at 60. The mold 60 comprises upper and lower mold sections 61 and 62, respectively, the upper section 61 having a funnel-shaped egress port 63 formed therein to offer interior mold surface up to the inner edge of the required elastomer fill.

The core member 65 has an enlarged longitudinal bore 66 at one end thereof for receiving the poured elastomer foam and radial ports 36 for distributing the same to the interstices between the sprags.

For purpose of regulating the thickness of the coating or cushion 16′, the integral shaft 67 of the core member 65 has a threaded portion 68 engaged by adjusting nut 69 which in turn abuts the lower mold section 62. It is readily seen, therefore, that the rotation of the nut 69 will move the core 65 and abutting sprags 11 thereby regulating the width of the arcuately-shaped groove 70 formed between the assembled sprags 11 and the mold sections 61–62.

In the formation of the second embodiment sprag assembly, the sprag-core-spacer ring assembly is interposed within the mold 60 and the mold placed in the temperature-controlled spinning fixture in a manner similar to that discussed above with relation to the first embodiment. An indiscriminate amount of elastomer foam is then poured into the core member 65, the elastomer distributing itself evenly through all the spaces. When the mold is spun in the fixture, any excess material is driven off at the edge of the desired fill through the egress port 63.

The density variation of the segment 15' is controlled by the centrifugal force obtained by the spinning of the mold 60 within the above-mentioned fixture, the formulation of the elastomer foam, the temperature to which the mold is exposed and the time of exposure of the mold to this temperature.

What is claimed is:

1. A process for molding an array of similarly configured planar sprag elements into an integral assembly in which the sprag elements are collectively rotatable about an annular axis, said process comprising the steps of:

juxtaposing the planar sprag elements at intervals about a core member having an axis so that an edge of each abuts the core member, there being an interstice between each sprag element and the adjacent sprag element;

encircling the juxtaposed sprag elements with an annular spacer ring for maintaining the relative positions of the elements;

placing the encircled sprag elements and core member within a mold having a relief configuration of the encircled sprag elements;

spinning the mold and its contents about the core axis;

introducing a greater amount of flowable elastomer foam into each of the interstices between adjacent sprag elements than is required to make a desired fill;

controlling the radial outermost points at which excess elastomer foam iss pilled out during said spinning step, said spinning step occurring at a speed to produce a centrifugal force to establish truncated segments of elastomer of radially varying density forming a segmented cylindrical interior elastomer boundary which extends parallel to the axis, which is positioned radially outwardly of the core adjacent edges of the sprag elements and through which protrude the core abutted edges of the sprag elements; and curing the foam remaining in the interstices during said spinning step to solidify said truncated segments of elastomer of radially varying density.

References Cited

UNITED STATES PATENTS 2,671,932   3/1954   Pique _____ 264—311 X

ROBERT F. WHITE, Primary Examiner

J. H. SILBAUGH, Assistant Examiner

U.S. Cl. X.R.

18—26; 29—597; 264—261, 277, 311